Sept. 1, 1959 W. R. FRANCIS 2,902,535
PREFOLDED CORD AND METHOD OF MAKING SAME
Filed Oct. 29, 1956 3 Sheets-Sheet 2

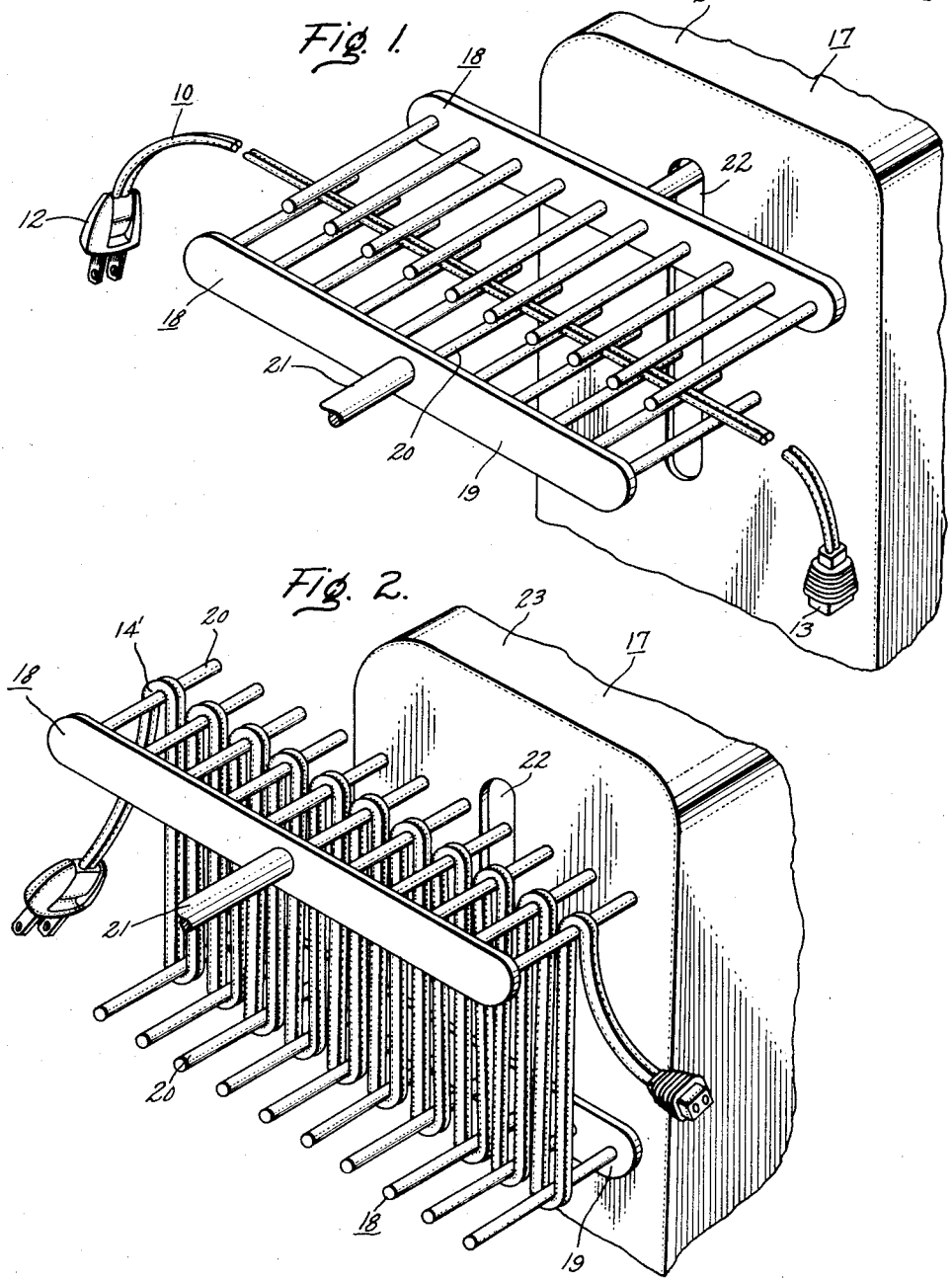

Inventor
Wallace R. Francis by Allard A. Braddock

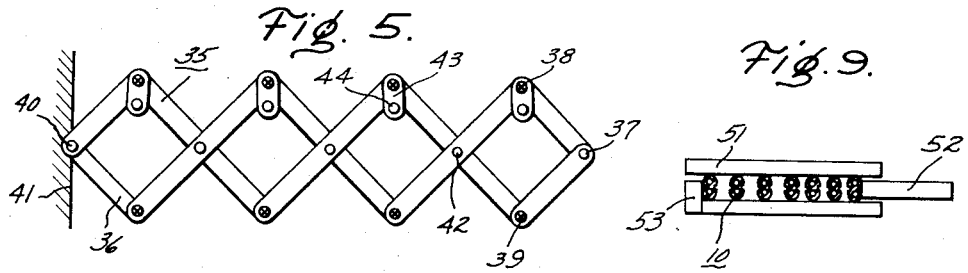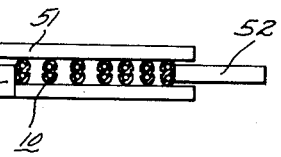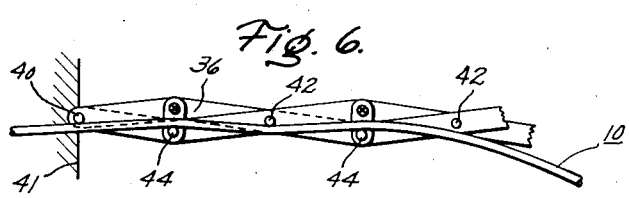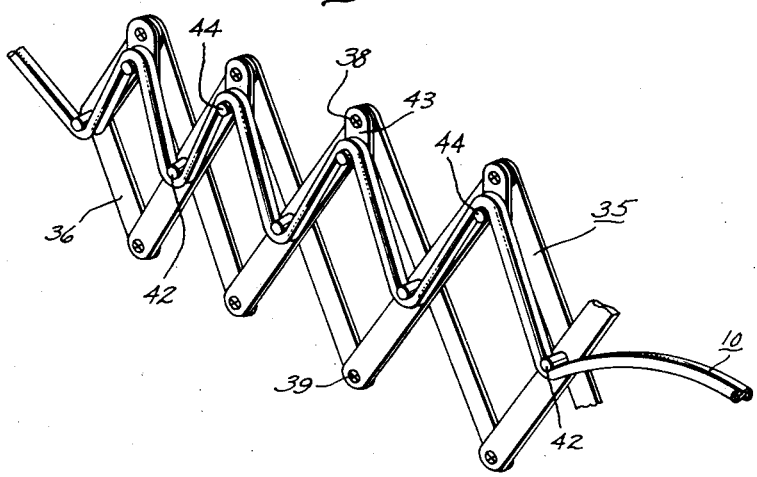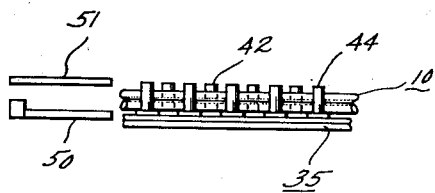

United States Patent Office 2,902,535
Patented Sept. 1, 1959

2,902,535

PREFOLDED CORD AND METHOD OF MAKING SAME

Wallace R. Francis, Milford, Conn., assignor to General Electric Company, a corporation of New York Application October 29, 1956, Serial No. 618,802

5 Claims. (Cl. 174—69)

The present invention relates to a flexible electrical cord having an extruded insulation where the cord is folded into equal sections that assume an accordion shape. The cord retains this folded serpentine shape after heat and/or pressure is applied to the folded portions of the cord to set the insulation.

It is well known in the cord art to manufacture "coiled cords" of rubber insulation for use on telephones where the cord is made extensible and automatically retractable by winding the cord into an elongated, helically, coiled shape and curing the cord to set the insulation. A later improvement on such a cord is to reverse the pitch of the helix after the insulation is set to increase the available restoring force so that the adjacent loops of the cord will lie in close contact with each other. An example of this is taught in the Wilson Patent No. 2,248,149.

The present invention is not concerned with an electrical cord that will be automatically retractable but merely one that may be gathered easily into a neat bundle. This is accomplished by the present invention of setting the insulation at the folded portions after the cord is folded sharply into an accordion shape. This invention is particularly useful in cordsets for electric shavers having an attachment plug at one end and a connector at the other where the conductors are very fine strands of flexible wire commonly referred to as tinsel wire. Thus, the conductors do not have a great deal of spring return which might otherwise defeat the folded character of the insulation. Shaver cord has two electrical conductors of stranded tinsel wire which are embedded in insulation having a ripping groove on the top and bottom of the insulation between the conductors so that it is an easy matter to separate the conductors. This ability to separate the conductors explains the derivation of the term "rip cord." Rip cord and, hence, shaver cord, has generally an oval cross-section so that in practicing our invention the cord is folded in the plane of the minor axis of the oval shape. This invention is not limited to an electric cord having a prefolded accordion shape since it also includes suitable methods and machines for making the cord.

Accordingly, the principal object of this invention is to provide an electrical cord with an accordion hank by setting the insulation at the folded portions of the cord to facilitate the bunching of the cord into a neat bundle.

A further object of this invention is to provide an electrical cord of the class described where the insulation is set by applying heat and/or pressure to the folded portions of the cord.

A further object of this invention is to provide an electrical cordset with an accordion hank by folding the cord into a serpentine shape and joining the cordset in an electrical circuit so that an overload current will raise the temperature of the cord to set the insulation.

A still further object of this invention is to provide suitable machines for folding the cord into an accordion shape so that heat and/or pressure may be applied to the folded portions of the cord to set the insulation.

This invention will be better understood from the following description taken in connection with the accompanying drawings, and its scope will be pointed out in the appended claims.

Figure 1 shows a partial view of a machine having a pair of relatively movable comb members which are used to fold an electrical cord into an accordion shape.

Figure 2 is a view similar to that of Figure 1 showing the cord after it is folded into the accordion shape.

Figure 5 is a view of a lazy tong mechanism which is a third modification of equipment that will fold an electrical cordset into an accordion shape.

Figure 6 is a view similar to that of Figure 5 except the lazy tong mechanism has been extended so that an electrical cordset may be placed in the mechanism.

Figure 7 is an isometric view of the assembly of Figure 5 except a cord is being shown hanked into a serpentine shape in a method step following that of Figure 6.

Figure 8 is an elevational view of the lazy tong mechanism of Figure 7 showing a method of removing the hanked cord from the mechanism.

Figure 9 is a view showing the hanked cord in the apparatus used in Figure 8 to remove the cord from the lazy tong mechanism, the purpose being to apply pressure to the folded cord so that there will be both pressure and heat applied to the folded portions of the cord to set the insulation.

Figure 4:
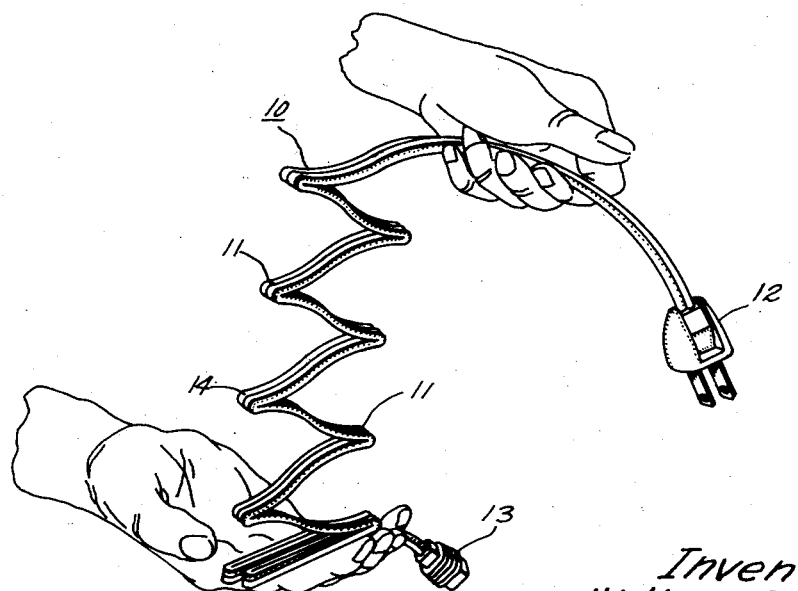
Figure 4 is a view showing how a person may easily arrange our inventive cordset into a neat bundle.

Referring in detail to the drawing, and in particular to Figure 4, there is shown an electric shaver cord 10 of generally oval cross-section having a ripping groove 11 in the extruded insulation of rubber or vinyl material between the pair of conductors A two-pronged attachment plug 12 is molded on one end of the cord and a female connector 13 on the opposite end for joining with an electric shaver in a well-known manner Electric shavers are usually stored in a leather case when the shaver is not being used and provision is also made in the case for receiving the electric cord However, these cases are of minimum inside dimensions so that it is necessary to become skilled in the method of folding the cord so that it will always fit in the case without interfering with the closing of the case Usually a metal band or clip is slipped over the folded cord to hold the cord in a neat bundle.

The present invention relates to any electric cord where it is desirable to hank the cord after it is used so that the cord will not be in the way. The invention is to fold the cord into an accordion hank having equally spaced folded ends 14 that are folded sharply in opposite directions in consecutive order to form a bellows or serpentine shape. These folds are made in the plane of the minor axis of the cord and heat and/or pressure are applied to these folded ends 14 to set the insulation. Thus, the cord will fold neatly into the hand as illustrated in Figure 4. In the case of a vinyl material which is a thermoplastic material, the heat merely softens the insulation briefly; and then it hardens when cooled. When a rubber compound is used for the insulation, the cord in its uncured state will have its folded ends set and the cord cured at the same time.

One method of folding a cord into an accordion hank is shown in Figures 1 and 2 of the drawing. Looking at Figure 1, there is shown a partial view of a machine 17 having a pair of parallel comb members 18. Each comb comprises a bar 19 and a plurality of parallel teeth 20 having a wide spacing. Each bar 19 is supported by a rod or handle 21. An elongated vertical slot 22 is cut in the face of an upstanding head portion 23 of the machine so that the upper comb 18 may move in a vertical plane as the handle 21 is raised and lowered in the slot 22. The lower comb 18 may either be fixed or likewise movable in a vertical plane but in an upward direction from that shown in Figure 1. The teeth 20 of the comb members are offset from the teeth in the opposite comb so that the teeth on one comb may move between the teeth of the other comb. This machine is operated in the following manner. First, the cord 10 is placed across the teeth of the lower comb 18 and under the teeth of the upper comb 18. Then the machine is actuated and the teeth of the upper comb move through the teeth of the lower comb, thereby carrying the cord and folding it into equally spaced lengths about the minor axis of the cord into the shape as best seen in Figure 2. It will be understood that the upper comb 18 of Figure 1 is now the lower comb 18 of Figure 2. The folds 14' of Figure 2 are not quite as sharp as the folds 14 of Figure 4 but this is merely a matter of degree and dependent upon the diameter of the teeth 20 of the combs. This invention still operates in the intended manner whether the folded ends are tightly made or are rounded slightly as shown in Figure 2. Once the cord has been hanked into the serpentine shape of Figure 2, the operator will plug both ends of the cord into an electric circuit and an overload current will be sent through the cord to raise the temperature of the conductors and thereby soften the insulation. Then when the cord is disconnected from the circuit, the insulation will cool and harden in this accordion hank and thereafter it will be an easy matter to gather the cord into neatly folded sections and yet have the same over-all hang dimensions.

Figure 3:
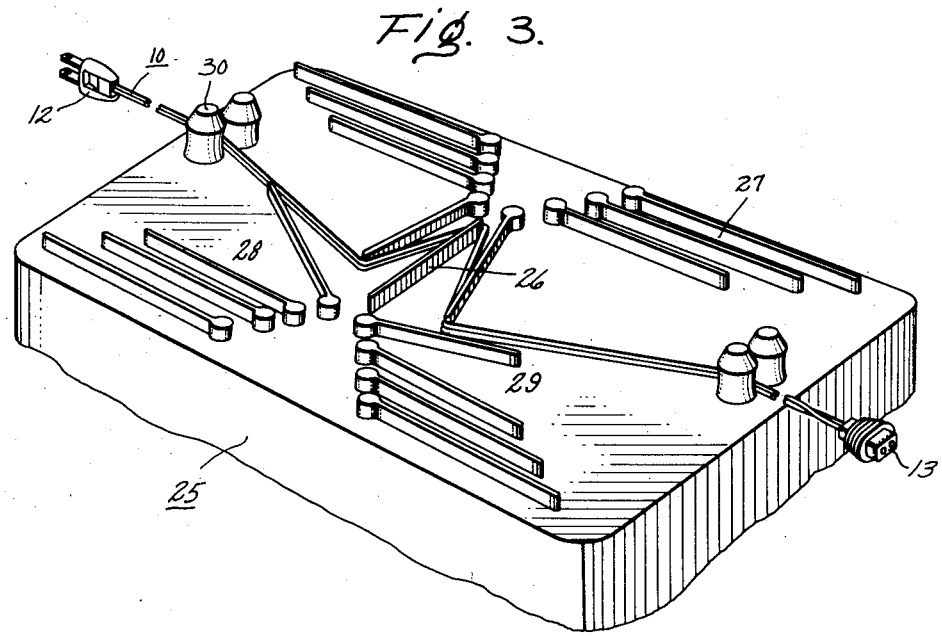
Figure 3 is a partial view of a machine showing a second method of folding an electrical cord into an accordion shape and applying pressure and heat to set the insulation.

A second piece of equipment for folding an electric cord into an accordion hank and setting the insulation at the folded ends is shown in Figure 3 of the drawings where 25 represents a work table that has a fixed upright plate 26 at the center and a plurality of pivoted pressure bars 27 which pivot about one end of the bar and are connected together to act in quick succession to fold the cord 10 into an accordion hank. The exact details of a gear train or drive mechanism for motivating the pressure bars 27 do not form part of this invention and are not disclosed here. There are two groups of pressure bars, one group being on the side 28 of the fixed plate 26 and the other group being on the opposite side 29. Each group is divided into two sets of opposed pressure bars which are slightly offset from each other. Also, there are a pair of guide rollers 30 on the opposite edges of the table 25 which serve to straighten out the cord as it is being folded into shape so that the folds will be in the plane of the minor axis of the cord.

The person operating this machine first finds the approximate center of the cord and places it over one side of the fixed plate 26. Then by using both hands, the cord is straightened out from the fixed plate until the cord is snapped between the guide rolls 30. Then the machine is energized so that the nearest pressure bar 27 will pivot first against the cord until the cord is moved against the fixed plate 26. This happens simultaneously on both sides of the fixed plate. After the cord has been folded, it will be understood that pressure is being applied at the folded ends of the cord by the tips of the pressure bars. Then the operator connects the two ends of the cord 10 into an electric circuit and an overload current is sent through the cord to heat up the conductors and soften the insulation, which later hardens after the current is withdrawn.

A third and preferred method of folding an electric cord into an accordion shape is illustrated diagrammatically in Figures 5-9 of the drawings. This method employs a lazy tong mechanism 35 as best shown in Figure 5 which comprises a series of links or arms 36 which are arranged in a crisscross fashion and pivoted together along the central longitudinal axis of the mechanism by means of the pins 37, the upper pins 38 and the lower pins 39. The left-hand end of the mechanism 40 is fixed to a supporting structure shown diagrammatically at 41 so that the mechanism may extend away from the support or retract toward the support, depending upon the direction of the force applied to the mechanism. First it is necessary to connect the cord 10 to the lazy tong mechanism 35 and this is accomplished by forming pin extensions or heads 42 on the central pins 37 as best seen in Figure 7. Also, a small plate 43 is fastened by the upper pins 38 to the mechanism. Each plate 43 extends inwardly of the mechanism a short distance and has at its lower end a pin extension or head 44 similar in nature to the head 42 mentioned previously. Thus, when the mechanism is extended to the maximum amount as shown in Figure 6, the pin heads 44 will move below the central longitudinal axis of the mechanism and, hence, below the pin heads 42 of the central pins 37. The cord 10 is loaded in this mechanism by threading the cord over the pins 44 and under the pins 42 which is possible with the cord in substantially a straight line as seen in Figure 6. Then it will be appreciated that as the mechanism is collapsed the pins 44 will move upwardly and the pins 42 will remain substantially in the same horizontal plane while the cord will be drawn shorter and folded into an accordion hank as seen in vertical elevation in Figure 8. One advantage of this lazy tong mechanism is that there is minimum slippage of the cord around the heads of the pins so that friction problems do not cause difficulty.

Current could be applied to this cord in this condition to raise the temperature of the insulation and to set it in place at the folded end. However, if it is desired to apply pressure as well as temperature the cordset must be removed from the mechanism. Figure 8 shows the lazy tong mechanism on an enlarged scale and a tray 50 diagrammatically shown at the left-hand side with a cover 51. The purpose of the tray is to fit between the pin heads 42 and 44 and under the cord so as to lift the cord out of the mechanism while it is folded in its accordion hank and confined between the tray 50 and its cover 51 as seen in Figure 9. Then a blade 52 would be brought in from the right side and moved against the cord collapsing it further and squeezing the cord against a shoulder 53 of the tray. The cord would then be in a condition to be processed by a heat treatment to first soften the insulation and then allow it to harden into this accordion hank. It will be understood by those skilled in this art that these various motions of the lazy tong mechanism could readily be arranged in sequence by mechanically driven cams or cam actuated air cylinders as is well-known in this art.

Having described above a novel electric cord having an accordion hank where the extruded insulation at the folded ends of the cord is set so that the cord may be grouped or bunched into equal folds, I have likewise illustrated my invention by disclosing a suitable method of applying heat and/or pressure to the folded ends of the cord to set the insulation and of practical equipment for folding the cord into this accordion shape with a minimum amount of complications.

Modifications of this invention will occur to those skilled in this art, and it is to be understood, therefore, that this invention is not limited to the particular embodiments disclosed but that it is intended to cover all modifications which are within the true spirit and scope of this invention.

What I claim as new and desire to secure by Letters Patent of the United States is:

1. A two-conductor parallel electrical cord of non-circular shape having an extruded insulation of rubber-like material over a pair of flexible conductors, the cord being folded sharply in opposite directions at equally spaced intervals in a plane that lies perpendicularly to a plane that includes the parallel conductors so as to give the cord an accordion fold or hank, the insulation at these folded portions being set into folded shape to facilitate the hanking of the cord into a neat bundle.

2. A plural-conductor parallel electrical cord having an extruded insulation of rubber-like material of generally oval cross-section covering a plurality of flexible conductors, the cord being folded sharply in opposite directions along its minor axis at equally spaced points in a consecutive order, the insulation at these points being set to hold this folded shape and to give the cord an accordion hank.

3. A method of making an electrical cord of non-circular shape with an accordion hank comprising the steps of extruding an insulating material over a plurality of flexible parallel conductors, collecting the cord into an accordion hank having equally spaced points along the cord at which the cord is folded back upon itself sharply in opposite directions along the minor axis of the cord, pressure being applied to clamp the folded ends together, and then applying heat to soften the insulation so that it will set in this folded shape.

4. A method of making an electrical cord of non-circular shape with an accordion hank comprising the steps of extruding an insulating material over a plurality of flexible parallel conductors, collecting the cord into an accordion hank having equally spaced points along the cord at which the cord is folded back upon itself sharply in opposite directions along the minor axis of the cord, and then applying heat to soften the insulation at the folded portions so that it will set in this serpentine shape.

5. A method of making an electrical cordset with an accordion hank comprising the steps of extruding an insulating jacket of non-circular shape over a parallel pair of flexible conductors, collecting the cord into an accordion hank having equally spaced points along the cord at which the cord is folded back upon itself sharply in opposite directions along the minor axis of the cord, and then joining the cord into an electrical circuit and applying an overload current which will raise the temperature of the conductors and soften the insulation so that the folded portions of the insulation will set in this serpentine shape.

References Cited in the file of this patent

UNITED STATES PATENTS

| | | |
|---|---|---|
| 1,769,950 | Hensley | July 8, 1930 |
| 2,173,096 | Campbell | Sept. 19, 1939 |
| 2,413,715 | Kemp et al. | Jan. 7, 1947 |
| 2,441,236 | Dansard | May 11, 1948 |
| 2,478,861 | Collins et al. | Aug. 9, 1949 |
| 2,516,347 | Schwartz et al. | July 25, 1950 |
| 2,581,421 | Lombard et al. | Jan. 8, 1952 |
| 2,652,444 | Dansard | Sept. 15, 1953 |